United States Patent Office 2,931,833
Patented Apr. 5, 1960

2,931,833

BENZYLDIALKYL-2-(1-HYDROXY-ALKYL) ALKYL AMMONIUM CHLORIDE COMPOUNDS

Joseph Z. Matt, Chicago, Ill., assignor to Armour and Company, Chicago, Ill., a corporation of Illinois No Drawing. Application December 29, 1954
Serial No. 478,520

3 Claims. (Cl. 260—567.6)

This invention relates to synthetic organic substances, and more particularly to branched-chain organic compounds and to methods of preparing such compounds.

It is an object of the present invention to provide a new class of organic substances including long-chain amino ketone compounds and derivatives thereof having desirable pesticidal properties. A further object of this invention is to provide unique tertiary and quaternary amine compounds being extremely useful as fungicidal and bactericidal agents.

The novel branched-chain organic compounds within the scope of the present invention can be represented by the formula:

$$CH_3-(CH_2)_y-W-X-(CH_2)_z-CH_3$$

wherein y is an integer of from 0 to 16; wherein z is an integer of from 5 to 20; wherein W represents a bivalent radical selected from the group consisting of C=O and CHOH; and wherein X represents a bivalent radical selected from the group consisting of (A) CH=R, (B) CH$_2$—R, (C) CH$_2$—R—NRR. In Formulae A, B, and C, the letter R represents an aliphatic hydrocarbon radical. Also included within the scope of this invention are the tertiary and quaternary amine salts of those aforementioned organic compounds having radicals of the C type.

In one aspect of the present invention, these branched-chain organic compounds are produced by reacting an aliphatic ketone material having from 8 to 40 carbon atoms with an aliphatic aldehyde material and either a primary or secondary amine substance. The product of this reaction is an aliphatic ketone containing from 8 to 40 carbon atoms and having substituted at the carbon position adjacent to the carbonyl group an aliphatic secondary or tertiary amine radical. When this aliphatic ketone derivative is subjected to a chemical reduction reaction with a selective reducing reagent the compound is converted to the hydroxy or alcohol derivative, i.e. the keto oxygen of this compound is reduced to a hydroxy group, and the resulting product is an aliphatic amino alcohol. On the other hand, when the aliphatic ketone derivative is decomposed, such as by pyrolysis under mild pressure, the compound is deaminated to form the corresponding unsaturated branched-chain aliphatic ketone product. This deaminated aliphatic ketone product may be selectively reduced to the corresponding deaminated unsaturated aliphatic alcohol by reacting such product with chemical reducing agents by a method similar to that employed in producing the aforementioned aliphatic amino alcohol. In the alternative, when this deaminated aliphatic ketone product is subjected to catalytic hydrogenation employing such a catalytic agent as Raney nickel, there is formed the corresponding saturated aliphatic ketone derivative. Furthermore, the deaminated aliphatic alcohol may also be converted to the corresponding saturated aliphatic alcohol derivative by reacting such alcohol with the catalytic hydrogenation agent.

Any aliphatic ketone compound having from 8 to 40 carbon atoms may be employed in producing the novel organic substances of this invention. Moreover, any substituted aliphatic ketone compound having from 8 to 40 carbon atoms and having a reactive group adjacent to the carbonyl group may be employed as a source material for these compounds. We mention, for example, such suitable aliphatic ketone compounds as 2-nonanone, 2-undecanone, 2-tridecanone, 2-heptadecanone, 8-pentadecanone, 10-nonadecanone, 2-octanone, 2-dodecanone, 2-hexadecanone.

Although any primary or secondary aliphatic amine may be employed in producing the novel compounds of this invention, better results are obtained when the aliphatic radical of the amine compound is an alkyl radical, and especially desirable results are obtained when a primary or secondary amine containing aliphatic radicals having less than 4 carbon atoms is employed. However, even better results are obtained when a primary or secondary amine containing alkyl radicals having less than 4 carbon atoms is utilized in the reaction. The reactivity of these amine compounds is reduced as the number of carbon atoms in the aliphatic radicals thereof is increased, and consequently the most preferred amine compounds for preparing the branched-chain organic substances have short-chain aliphatic radicals. Therefore, the most desirable results are obtained when the aliphatic radicals of the amine compounds are methyl or ethyl radicals.

The aliphatic aldehyde material employed in preparing the organic substances of this invention is preferably an aliphatic aldehyde having less than 4 carbon atoms. However, better results are achieved when such aldehyde material is an alkanal compound, and especially desirable results are obtained with an alkanal compound having less than 4 carbon atoms. In a manner similar to that of the primary and secondary amines, the reactivity of an aliphatic aldehyde compound decreases with an increase in the number of carbon atoms therein, and consequently a material such as formaldehyde is most desirable in the preparation of these organic substances.

The branched-chain amino ketone compounds of this invention can be prepared by the interaction of an aliphatic ketone, an aldehyde, and a primary or secondary amine. This reaction may be represented by the formula:

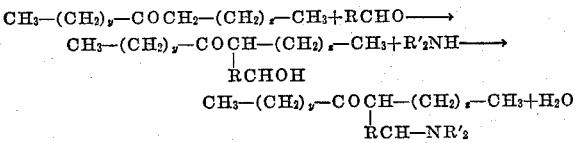

wherein y is an integer of from 0 to 16, wherein z is an integer of from 5 to 20, wherein R is either hydrogen or an aliphatic hydrocarbon radical, and wherein R' is an aliphatic hydrocarbon radical. Preferably, R is either hydrogen or an aliphatic hydrocarbon radical having less than 3 carbon atoms and R' is an aliphatic hydrocarbon radical having less than 4 carbon atoms. However, better results are achieved with the compound wherein R is either hydrogen or an alkyl group having less than 3 carbon atoms and wherein R' is an alkyl group having less than 4 carbon atoms. If desired, a primary amine having the general formula R'NH$_2$ may be substituted for the secondary amine employed in the formulae hereinbefore exemplified. Moreover, a salt of either primary or secondary amine substances may be suitably employed in this reaction.

The chemical conditions for carrying out this reaction are those employed in a typical Mannich reaction, and are well known in the art. For example, the reactants may be combined in an acidified solvent medium, such as ethanol, and refluxed for a period of time sufficient to provide completion of the reaction. Thereafter, the solvent may be removed by, for example, distillation, and the recovered reaction product can then be neutralized by mixing therewith an alkali such as aqueous ammonia. The resulting ketone product thus obtained may be extracted with, for example, ether, washed with water, and dried in suitable apparatus.

The tertiary or quaternary amine salts of these novel branched-chain amino ketone compounds can be prepared by reacting therewith, respectively, either an hydrogen halide such as hydrochloric acid or an active alkyl halide such as benzyl chloride. These salts of the amino ketone compounds are formed by well-known procedures. For example, in the preparation of the quaternary derivatives, an amino ketone can be combined with the activated alkyl halide in media such as methanol and mixtures of methanol and ethyl acetate, and maintained at an elevated temperature for a sufficient period of time to induce the reaction. If desired, the quaternizing reaction can be carried out at super-atmospheric pressures under elevated temperature conditions in a shorter time period. If it is desired to prepare the tertiary amine salt of the amino ketone compound, an hydrogen halide such as hydrogen chloride can be passed through a mixture of the amino ketone and a solvent therefor such as a petroleum hydrocarbon fraction having a suitable boiling point range. The tertiary amine or quaternary salts may thereafter be freed of the solvent medium by, for example, distillation to provide a substantially analytically pure product.

The branched-chain amino alcohol compounds of this invention are produced by a reaction involving as a starting material the branched-chain amino ketone product hereinbefore disclosed. This conversion can be effected by a selective chemical reduction under conditions employing such reducing reagents as lithium aluminum hydride and sodium borohydride. This reduction reaction may be carried out at room temperature, for example, by forming a slurry of lithium aluminum hydride in anhydrous ether, and combining therewith an ethereal solution of the amino ketone product. After refluxing the mixture, or permitting the mixture to stand at room temperature, for a period of time sufficient to effect the reaction, the excess hydride can be decomposed by addition to the mixture of ethyl acetate. Thereafter water can be combined with the mixture, and the aqueous phase separated from the ether phase by, for example, decantation. The aqueous phase can then be treated with an alkali such as sodium hydroxide and extracted with ether. Thereafter, the combined ethereal extracts can be subjected to evaporation to eliminate the ether and to provide a residue containing the branch-chain amino alcohol compound.

The novel branched-chain amino alcohol compound formed in this process can be represented by the following formula:

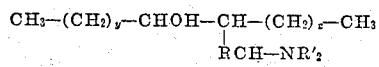

wherein $y$ is an integer of from 0 to 16, wherein $z$ is an integer of from 5 to 20, wherein R is either hydrogen or an aliphatic hydrocarbon radical, and wherein R' is an aliphatic hydrocarbon radical. These alcohol compounds can be produced from any of the branched-chain amino compounds hereinbefore disclosed. Moreover, the tertiary and quaternary amine salts of this alcohol compound may be produced by methods similar to those disclosed for the preceding amino ketone derivatives.

When the novel branch-chain amino ketone derivatives hereinbefore disclosed are not reduced to the corresponding amino alcohol, there is a tendency for such compounds to undergo decomposition and form new and useful deaminated unsaturated branched-chain ketone compounds. This decomposition reaction may also be accomplished by subjecting the amino ketone derivative to pyrolysis under mild pressure. These deaminated ketone compounds may be represented by the formula:

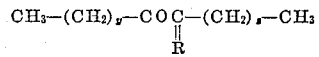

wherein $y$ is an integer of from 0 to 16, wherein $z$ is an integer of from 5 to 20, and wherein R is a bivalent aliphatic hydrocarbon radical. However, even better results are obtained with the compound wherein R represents a bivalent aliphatic hydrocarbon radical having less than 4 carbon atoms, and especially desirable results are achieved with the compound wherein R represents a bivalent alkyl group having less than 4 carbon atoms.

When a catalytic hydrogenation agent such as Raney nickel is employed in the reduction of the branched-chain amino ketone compound under pyrolytic conditions with mild pressure, there is formed, instead of the unsaturated, deaminated ketone derivative, the corresponding saturated ketone derivative. This novel and useful product can be represented by the formula:

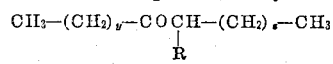

wherein $y$ is an integer of from 0 to 16, wherein $z$ is an integer of from 5 to 20, and wherein R is a monovalent aliphatic hydrocarbon radical.

The unsaturated or saturated, branched-chain, deaminated ketone compounds hereinbefore disclosed, which compounds can be prepared by the special methods hereinbefore disclosed, may be converted to the corresponding alcohol derivatives by a chemical reduction reaction. The reagents employed in this chemical reduction may be, for example, lithium aluminum hydride, sodium borohydride or sodium in alcohol. The novel and useful compounds thereupon produced may be represented by the formula:

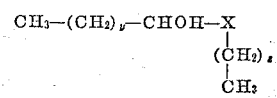

wherein $y$ is an integer of from 0 to 16, wherein $z$ is an integer of from 5 to 20, and wherein X is a bivalent radical selected from the group consisting of (A) C=R and (B) CH—R in which R represents an aliphatic hydrocarbon radical. When the source material for the chemical reduction reaction is an unsaturated branched ketone compound, X represents C=R. On the other hand, when such source material is the saturated ketone product, X represents CH—R.

The following examples further illustrate the preferred embodiments of this invention, the methods of preparing such preferred embodiments, and the physical and chemical analyses thereof.

EXAMPLE I

The following method was employed in preparing 3 - dimethylaminomethyl - 2 - heptadecanone. A reaction mixture containing 240 grams (0.95 mole) of methyl pentadecyl ketone, 170 grams of 35% formaldehyde solution (2.0 moles), and 89.1 grams (1.1 moles) of dimethylamine hydrochloride in one liter of ethanol and 10 cc. of concentrated hydrochloric acid was prepared. This mixture was refluxed in suitable apparatus for a period of 5 days, and thereafter the major portion of the ethanol was removed by distillation in vacuo. The residue therefrom was alkalinized, extracted with ether, and the ether extract separated from the residual ethanol phase by decantation. The ether extract was washed with water to remove excess dimethylamine, and thereafter the ether was evaporated to provide a dry product.

EXAMPLE II

The 3-dimethylaminomethyl-2-heptadecanone compound obtained by the method of Example I was converted to the corresponding alcohol by the following chemical reduction reaction. The gross amount of ketone product obtained in Example I was dissolved in 250 cc. of methanol at room temperature. The reduction reagent was prepared by dissolving 16.1 grams (0.425 mole) of sodium borohydride in a mixture of 100 cc. of methanol and 50 cc. of 5% sodium hydroxide solution. The reduction reagent was combined with the amino ketone solution by dropwise addition at room temperature. The reaction mixture thus formed was diluted with 500 cc. of water, and thereafter subjected to mild hydrolysis in the presence of 200 cc. of concentrated hydrochloric acid. This hydrolyzed mixture was clarified by the addition thereto of a small portion of ethanol, and thereafter such mixture was extracted with a low-boiling petroleum hydrocarbon fraction to remove non-basic materials. The ethanol was removed from the extracted mixture by distillation, and the residue therefrom was alkalinized and reextracted with the petroleum hydrocarbon fraction. The petroleum hydrocarbon extract was washed with water, dried, and fractionally distilled to provide 3-dimethylaminomethyl-2-heptadecanol product in 45% yield. This material was further purified by a second rectification, and in analysis of the purified product the boiling point thereof was found to be 165 to 170° C. at a pressure of 4 mm. Hg.

EXAMPLE III 3-dimethylaminomethyl-2-nonanone was prepared by the following method. A reaction mixture was formed containing 355 grams (2.5 moles) heptyl methyl ketone, 425 grams (5 moles) of 35% formalin, and 225 grams (2.75 moles) of dimethylamine hydrochloride in 500 cc. of ethanol and 10 cc. of concentrated hydrochloric acid. This reaction mixture was refluxed in suitable apparatus for a period of 48 hours, and thereafter the ethanol was removed by distillation in vacuo. The residue therefrom was neutralized by the addition thereto of an excess amount of ammonium hydroxide. Then, this neutralized residue was extracted with 4 portions of ether, washed with water to remove unreacted dimethylamine, and dried over sodium sulfate. This product was stored at 0° C. until further use.

EXAMPLE IV

The 3-dimethylaminomethyl-2-nonanone obtained in the process of Example III was converted to the corresponding alcohol by the following chemical reduction method. A slurry composed of 75 grams (2 moles) of lithium aluminum hydride in anhydrous ether was formed, and an ethereal solution of the amino ketone product was added thereto, dropwise, while such slurry was continuously agitated and cooled in an ice bath. The reaction mixture was permitted to stand for a period of 24 hours, and thereafter the excess hydride was decomposed by the dropwise addition of ethyl acetate to such mixture. Then water was combined with the solvent mixture, and the aqueous and solvent phases thereupon formed were separated by decantation. The turbid aqueous phase obtained thereby was treated with sodium hydroxide solution, and thereafter extracted with ether. The combined ethereal extracts were washed with water, and the ether separated therefrom by evaporation. The residue obtained in evaporation step was acidified, and subsequently extracted with a low-boiling petroleum hydrocarbon fraction to remove non-basic material. The reaction product was then precipitated in the aqueous mixture by the addition thereto of anhydrous ammonia, and such precipitate was separated from the supernatant liquid by centrifugation. This precipitate was washed with ether, and then dried. The dried precipitate was purified by fractional distillation at a pressure of 2.2 mm. Hg. The yield of distilled product was 223 grams, which was equivalent to 45% of the theoretical yield. The analysis of this product obtained in the fractional distillation can be outlined as follows: 166 grams of such product having a boiling point of between 110 and 115° C. and a second fraction of 57 grams having a boiling point of from 115 to 120° C. The theoretical neutral equivalent for this product was 201, whereas the low-boiling fraction had a neutral equivalent of 206, and the high-boiling fraction a neutral equivalent of 210. Therefore, the product obtained was identified as 3-dimethylaminomethyl-2-nonanol.

EXAMPLE V

The branched-chain amino-ketone compound obtained by employing methyl undecyl ketone as a source material in the method of Example I was converted to a 3-methyl-2-tridecanol by the following method. A reaction mixture composed of the ketone product dissolved in ethanol was reduced with Raney nickel catalyst at a temperature of 200° C. and a pressure of 2,000 pounds. The reaction product was separated from the solvent and dried. The product obtained thereby was 3-methyl-2-tridecanone. This ketone product was subjected to a chemical reduction reaction employing sodium in ethanol as the reducing reagent. This reduction product was fractionally distilled to yield a liquid having a boiling point of 100° C. at a pressure of 0.2 mm. of mercury, and an $n_D^{25}$ of 1.4446. Infrared examination of this distillate identified the product as a secondary alcohol differing from 3-tetradecanol in its much stronger methyl band, i.e., the group band at 7.3 microns. Analysis of the product, predicated upon a composition of $C_{14}H_{30}O$, yielded the following results:

Calculated—C, 78.50; H, 14.02. Found—C, 78.57; H, 14.05.

EXAMPLE VI

The quaternary derivative of 9-dimethylaminomethyl-10-nonadecanone was prepared by the following method. A molar equivalent of benzyl chloride was combined with the ketone product in an ethyl acetate-methanol medium. The reaction mixture was heated for a period of 3 days, and thereafter the solvent mixture was evaporated. This product was identified as benzyldimethyl-2-octyl-3-ketododecyl-ammonium chloride.

EXAMPLE VII

The corresponding quaternary compound of 3-ethylmethylaminomethyl-2-heptadecanol can be prepared by the following method. The alcohol compound is combined with an excess molar equivalent of methyl chloride in methanol. This mixture is then heated at a temperature of 125° C. under super-atmospheric pressure for a period of time sufficient to produce the desired reaction. The reaction product can then be separated from the solvent medium by distillation in vacuo. The resultant product will be ethyldimethyl-2(1-hydroxyethyl) hexadecylammonium chloride.

EXAMPLE VIII

The tertiary amine salt corresponding to 3-dimethylaminomethyl-2-tridecanol was prepared by the following method. The alcohol compound was dissolved in a petroleum hydrocarbon fraction at room temperature. Hydrogen chloride gas was passed through the solution in such amount as to provide completion of the reaction. The reaction product was separated from the solvent medium by distillation in vacuo. The product was identified as dimethyl-2(1-hydroxyethyl) dodecylammonium chloride.

EXAMPLE IX

The branched-chain amino-ketone compounds of this invention were converted to the corresponding alcohol derivative, and thereafter subjected to analytical procedures. In addition, the amino alcohol compounds thereupon formed were converted to the corresponding tertiary and quaternary amine salts, and such salts were also analyzed.

These amino alcohol products may be represented by the formula:

$$\text{RCHCHOHR}'$$
$$\text{CH}_2\text{N(CH}_3)_2$$

and the corresponding amine salts thereof may be represented by the formula:

$$\text{RCHCHOHR}'$$
$$\text{CH}_2\text{N(CH}_3)_2\text{R}''$$

The analytical results thereupon obtained were as follows:

10 minutes. After this exposure period, 0.5 ml. of the mixture was removed and plated on glucose tryptone extract agar containing 0.1% azolectin as a quaternary neutralizing agent. These plates were incubated for a period of two days at a temperature of 37° C., and thereafter the number of surviving organisms therein were counted. The microorganisms employed in the tests were:

(A) *Micrococcus pyogenes* v. *aureus*.
(B) *Escherichia coli*.

The control germicidal agent employed in the tests was (1) octadecyltrimethylammonium chloride, and the organic amine salts of this invention tested were:

(2) Benzyldimethyl - 2 - (1 - hydroxyethyl)hexadecylammonium chloride.

| R | R' | R'' | Percent Conversion of Ketone to the Alcohol Compound in the Presence of— | | Boiling Point of the Alcohol Compound | $n_D^{25}$ of the Alcohol Compound | Percent Conversion of the Alcohol Compound to the Salt | Empirical Formula of Compound | Equivalent | | Analysis | | | |
|---|---|---|---|---|---|---|---|---|---|---|---|---|---|---|
| | | | | | | | | | | | Nitrogen | | Chlorine | |
| | | | NaBH$_4$ | LiAlH$_4$ | | | | | Calc. | Found | Calc. | Found | Calc. | Found |
| Hexyl | Methyl | | | 45 | 112 at 2 mm. | | | C$_{12}$H$_{27}$NO | 201 | 206 | | | | |
| | | Hydrogen | | | | | 93 | C$_{12}$H$_{28}$NOCl | | | 5.89 | 5.65 | 14.92 | 15.60 |
| | | Methyl | | | | | 35 | C$_{13}$H$_{30}$NOCl | | | 5.56 | 5.38 | 14.09 | 13.95 |
| | | Benzyl [1] | | | | | 86 | C$_{19}$H$_{34}$NOCl | | | 4.27 | 4.15 | 10.82 | 10.50 |
| Octyl | do | | 36 | 45 | 120 at 0.7 mm. | 1.4457 | | C$_{14}$H$_{31}$NO | 229 | 236 | | | | |
| | | Hydrogen | | | | | 77 | C$_{14}$H$_{32}$NOCl | | | 5.27 | 5.10 | 13.34 | 13.20 |
| | | Methyl | | | | | 55 | C$_{15}$H$_{34}$NOCl | | | 5.00 | 4.59 | 12.67 | 12.32 |
| | | Benzyl | | | | | 54 | C$_{21}$H$_{38}$NOCl | | | 3.93 | 3.92 | 9.97 | 10.25 |
| Decyl | do | | | 51 | 147 at 0.9 mm. | 1.4510 | | C$_{16}$H$_{35}$NO | 257 | 255 | | | | |
| | | Hydrogen | | | | | 71 | C$_{16}$H$_{36}$NOCl | | | 4.77 | 4.70 | 12.07 | 12.20 |
| | | Methyl | | | | | 78 | C$_{17}$H$_{38}$NOCl | | | 4.55 | 4.30 | 11.52 | 11.95 |
| | | Benzyl | | | | | 63 | C$_{23}$H$_{42}$NOCl | | | 3.65 | 3.66 | 9.24 | 9.25 |
| Tetradecyl | do | | 45 | 41 | 165 at 0.4 mm. | 1.4532 | | C$_{20}$H$_{43}$NO | 313 | 315 | | | | |
| | | Hydrogen | | | | | 67 | C$_{20}$H$_{44}$NOCl | | | 4.00 | 3.96 | 10.13 | 10.08 |
| | | Methyl | | | | | 47 | C$_{21}$H$_{46}$NOCl | | | 3.85 | 3.88 | 9.74 | 9.95 |
| | | Benzyl | | | | | 81 | C$_{27}$H$_{50}$NOCl | | | 3.18 | 3.02 | 8.06 | 7.72 |
| Hexyl | Heptyl | | | 68 crude | 130 at .3 mm. | 1.4502 | | C$_{18}$H$_{39}$NO | 286 | 295 | | | | |
| | | Hydrogen | | | | | 69 | C$_{18}$H$_{40}$NOCl | | | 4.35 | 4.00 | 11.04 | 11.58 |
| | | Benzyl | | | | | 90 | C$_{25}$H$_{46}$NOCl | | | 3.40 | 3.60 | 8.61 | 8.72 |
| Octyl | Nonyl | | 34 | | 160 at 0.2 mm. | 1.4542 | | C$_{22}$H$_{47}$NO | 341 | 360 | | | | |
| | | Hydrogen | | | | | 91 | C$_{22}$H$_{48}$NOCl | | | 3.71 | 3.48 | 9.38 | 9.82 |
| | | Benzyl [2] | | | | | 86 | C$_{29}$H$_{54}$NOCl | | | 2.93 | 2.94 | 7.58 | 7.48 |
| Decyl | Undecyl | | 46 crude | | 190-5 at 0.2 mm. | 1.4564 | | C$_{26}$H$_{55}$NO | 398 | 485 | | | | |
| | | Benzyl | | | | | 58 | C$_{33}$H$_{62}$NOCl | | | 2.68 | 2.68 | 6.78 | 6.54 |

[1] The melting point of this quaternary product was 135 to 138° C.
[2] The melting point of this quaternary product was 117 to 120° C.

EXAMPLE X

The germicidal activity of the following tertiary and quaternary amine salt compounds was determined by the following method. A stock solution of each compound was prepared containing 0.1% of such compound in sterile distilled water. To 5 ml. portions of each stock solution was added 0.5 ml. of a 1 to 15 dilution of a 24 hour incubated filtered broth culture of the particular organism. These mixtures were submerged in a water bath at a temperature of 37° C. for a period of (3) Benzyldimethyl - 2 - (1 - hydroxyethyl)dodecylammonium chloride.
(4) 2 - (1 - hydroxyethyl)decyltrimethylammonium chloride.
(5) Benzyldimethyl - 2 - (1 - hydroxyethyl)decyl ammonium chloride.
(6) Dimethyl - 2 - (1 - hydroxyethyl)decylammonium chloride.

The results of these tests are presented in the following tables.

*Organism (A)*

[Number of survivors per 0.5 ml. of the mixture after 10 minutes' exposure at 37° C. (Average of three separate tests).]

CONCENTRATION OF PRODUCT IN DISTILLED WATER

| Product | 1-1,000 | | | 1-2,000 | | | 1-3,000 | | | 1-4,000 | | | 1-5,000 | | | 1-7,000 | | | 1-9,000 | | | 1-10,000 | | | 1-20,000 | | |
|---|---|---|---|---|---|---|---|---|---|---|---|---|---|---|---|---|---|---|---|---|---|---|---|---|---|---|---|
| 4 | 0 | 0 | 0 | 25 | 46 | 7 | 50 | 650 | 400 | TMTC* (3) | | | | | | | | | | | | | | | | | |
| 5 | 0 | 0 | 0 | 2 | 0 | 65 | 500 | TMTC | (2) | TMTC | (3) | | | | | | | | | | | | | | | | |
| 6 | 0 | 1 | 4 | 0 | 85 | 250 | 600 | TMTC | (2) | TMTC | (3) | | | | | | | | | | | | | | | | |
| 3 | | | | | | | | | | | | | 0 | 0 | 0 | 0 | 0 | 0 | 0 | 0 | 0 | 0 | 225 | 20 | TMTC | (3) | |

CONCENTRATION OF PRODUCT IN DISTILLED WATER

| Product | 1-10,000 | | | 1-50,000 | | | 1-70,000 | | | 1-80,000 | | | 1-100,000 | | | 1-150,000 | | | 1-200,000 | | | 1-250,000 | | | 1-500,000 | |
|---|---|---|---|---|---|---|---|---|---|---|---|---|---|---|---|---|---|---|---|---|---|---|---|---|---|---|
| 2 | 0 | 0 | 0 | 0 | 0 | 0 | 0 | 0 | 0 | 0 | 0 | 0 | 0 | 0 | 0 | 0 | 0 | 13 | 3 | 10 | 6 | 450 | 35 | 650 | TMTC | (2) |
| 1 | 0 | 0 | 0 | 0 | 0 | 0 | 0 | 0 | 0 | 0 | 0 | 0 | 0 | 0 | 0 | 0 | 0 | 0 | 20 | 0 | 15 | 600 | 85 | | TMTC | (3) |

*TMTC indicates that there were too many organisms to count, and the bracketed numeral represents the number of times such a result was obtained.
The distilled water employed herein had an organism count of 2,500,000 per 0.5 ml.
The results indicate that as an average of three tests the dilution factor of the product effecting a 99.99% destruction of organism (A) was 250 or less.

Organism (B)

[Number of survivors per 0.5 ml. of the mixture after ten minutes' exposure at 37° C. (average of three separate tests).]

CONCENTRATION OF PRODUCT IN DISTILLED WATER

| Product | 1-1,000 | | | 1-2,000 | | | 1-3,000 | | | 1-4,000 | | | 1-5,000 | | | 1-7,000 | | | 1-9,000 | | | 1-10,000 | | | 1-20,000 | | |
|---|---|---|---|---|---|---|---|---|---|---|---|---|---|---|---|---|---|---|---|---|---|---|---|---|---|---|---|
| 4 | 0 | 0 | 0 | 0 | 0 | 12 | 120 | 350 | 650 | TMTC* (3) | | | | | | | | | | | | | | | | | |
| 5 | 0 | 0 | 0 | 25 | 45 | 3 | 320 | 35 | 600 | TMTC (3) | | | | | | | | | | | | | | | | | |
| 6 | 0 | 0 | 0 | 0 | 0 | 2 | 500 | 20 | 700 | TMTC (3) | | | | | | | | | | | | | | | | | |
| 3 | 0 | 0 | 0 | 0 | 0 | 0 | 0 | 0 | 0 | 0 | 0 | 0 | 0 | 2 | 0 | 13 | 5 | 0 | 6 | 20 | 3 | 0 | 0 | 40 | 200 | 350 | 10 |

CONCENTRATION OF PRODUCT IN DISTILLED WATER

| Product | 1-10,000 | | | 1-50,000 | | | 1-70,000 | | | 1-80,000 | | | 1-100,000 | | | 1-150,000 | | | 1-200,000 | | | 1-250,000 | | | 1-500,000 |
|---|---|---|---|---|---|---|---|---|---|---|---|---|---|---|---|---|---|---|---|---|---|---|---|---|---|
| 2 | 0 | 0 | 0 | 0 | 0 | 0 | 0 | 0 | 0 | 0 | 2 | 0 | 1 | 3 | 0 | 25 | 0 | 14 | 35 | 110 | 65 | 650 | 1,200 | 220 | TMTC (3) |
| 1 | 0 | 0 | 0 | 0 | 0 | 0 | 0 | 0 | 0 | 0 | 0 | 0 | 1 | 0 | 0 | 16 | 3 | 0 | 20 | 45 | 2 | 1,500 | 200 | 400 | TMTC (3) |

*TMTC indicates that there were too many organisms to count, and the bracketed numeral represents the number of times such a result was obtained.

The distilled water employed in this test had an organism count per 0.5 ml. of 2,000,000.

The results indicate as an average of three tests that the dilution factor of the product effecting an organism destruction of at least 99.99% was 200 or less.

While in the foregoing specification the present invention has been described in relation to certain specific embodiments and many details thereof have been set forth for the purpose of illustration, it will be apparent to those skilled in the art that this invention is susceptible to other embodiments, and that many of the specific details can be varied widely without departing from the spirit and concept of the invention.

I claim:

1. Benzyldimethyl-2-(1-hydroxyoctyl) octyl ammonium chloride.
2. Benzyldimethyl-2-(1-hydroxyethyl) hexadecyl ammonium chloride.
3. Benzyldimethyl-2-(1-hydroxyethyl) dodecyl ammonium chloride.

References Cited in the file of this patent

UNITED STATES PATENTS

| | | |
|---|---|---|
| 2,221,931 | Treboux | Nov. 19, 1940 |
| 2,686,808 | Sprague | Aug. 17, 1954 |

FOREIGN PATENTS

| | | |
|---|---|---|
| 644,427 | Denmark | Apr. 23, 1946 |
| 997,728 | France | Sept. 12, 1951 |
| 1,017,761 | France | Oct. 1, 1952 |
| 233,519 | Germany | Apr. 8, 1911 |
| 247,145 | Germany | May 21, 1912 |